INVENTOR
STANLEY HORROCKS
BY Pearson + Pearson
ATTORNEYS

United States Patent Office 3,518,967
Patented July 7, 1970

3,518,967
FLUIDISED BED COATING APPARATUS
Stanley Horrocks, The Mill House, Lamplugh,
Workington, Cumberland, England
Filed Oct. 17, 1966, Ser. No. 587,149
Claims priority, application Great Britain, Oct. 29, 1965,
45,860/65
Int. Cl. B05c 5/02; B05b 17/00
U.S. Cl. 118—303                2 Claims

ABSTRACT OF THE DISCLOSURE

An apparatus is provided comprising means for producing a zone of ordered, solid particles in a fluidised bed and a spray nozzle positioned in the fluidised bed.

---

Figure 1:
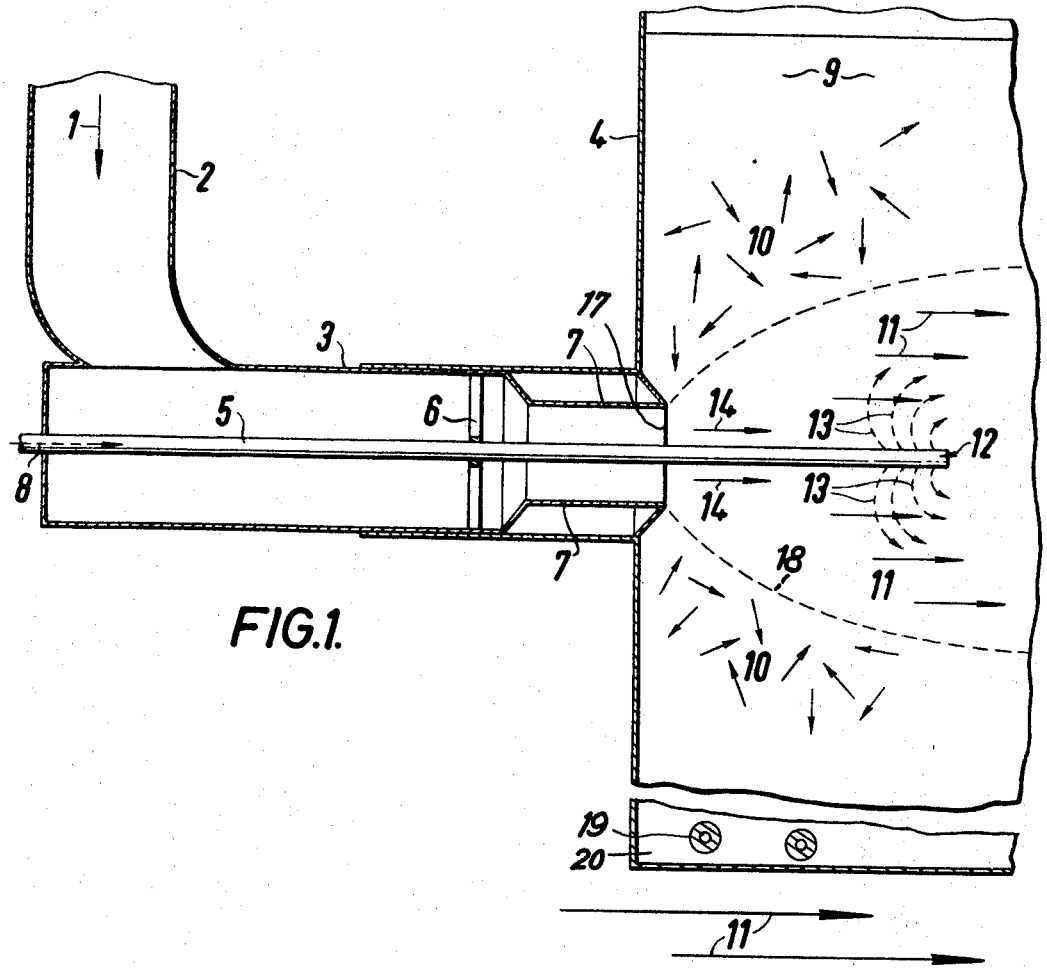

This invention relates to fluid beds and to the introduction of slurries or liquids containing solids, in solution or suspension, into a fluid bed of substantially dry, hot particles for the purpose of obtaining the solid from the said liquid or slurry, by evaporation.

Fluid beds are used widely throughout industry mainly for the reaction of solids with gases, for the transfer of heat to and from solids by gases. The obtaining of solids from liquids or slurries however, is largely carried out in other forms of apparatus such as utilise a spray drying technique.

In the spray drying technique the nature of the operation usually produces a solid of comparatively low bulk density, and sometimes other undesirable properties associated with extended drying time and low bulk density, are produced. These undesirable properties arise largely because the liquid droplet is in contact with the drying medium, usually hot gas or air, at the gas/liquid interface and this produces a rapid evaporation at the surface, depositing solids at the interface. The liquid inside the particle then has to diffuse and force its way through the outer solid layer in order to be able to evaporate into the gas phase with a resultant puffing up of the particle thus giving a low bulk density powder.

If the liquid droplet could be deposited on to a substantially dry, hot particle which, because of its higher heat capacity compared to the surrounding gas and because the liquid droplet has spread over the surface of the otherwise dry particle, would allow of a high rate of heat transmission to the droplet, then it is likely that the drying time would be very small and the manner of drying would give an increased or at least allow the maintenance of a high bulk density of the dried particles and produce other desirable properties of the particles or the evaporated liquid.

A convenient way to carry out the operation is by the introduction of the liquid droplets into a fluidised bed of substantially dry, hot particles in such a manner that its chances of impacting onto a substantially dry, hot particle is enhanced.

Normally, a fluidised bed of solid particles is maintained in a fluidised condition by a fluidising gas which in quantity, is in excess of the amount of fluidising gas required for incipient fluidisation.

The excess of gas over and above that required for incipient fluidisation passes through the bed as bubbles and therefore the bed consists of a matrix of dense material, in a barely fluidised condition, containing relatively large, rapidly rising, bubble-form voids. Within the matrix of dense material, there is relatively little chance for particles to move great distances, so that mixing effects occur primarily as a result of gross bulk movements within the bed as dense material fills the spaces formerly occupied by bubbles which have risen and then is again pushed up or aside as new bubbles come up from the bottom.

Thus, in a particular volume of a normally fluidised bed the dense phase particles are in small scale disordered random motion and periodically bubble-like voids pass through the volume causing large scale disturbances and movements of solids which again are disordered and random.

A liquid spray nozzle operating in a fluid bed has to accomplish two tasks, atomise the liquid into droplets and provide sufficient momentum and direction to the droplets, to move them away from the nozzle with a minimum of recombination.

Merely introducing a liquid spray into a particular portion of a fluidised bed of substantially dry particles in motion as described above, detrimentally affects the spray nozzle's ability to carry out its two functions. The dense phase solid particles in random motion, inhibit the movement of droplets away from the nozzle resulting in partially dry particles being present in the spray nozzle zone for a long time and thus producing large agglomerates of partially dry material and the movement of bubble-like voids past the nozzle also produces unsteady spray conditions again resulting in agglomeration and partially dry material sticking to the nozzle and other metal surfaces in the proximity of the nozzle.

The primary object of the present invention is to provide a method of operating a spray nozzle in a fluid bed which avoids the aforementioned disadvantages. Thus, according to the present invention, there is provided a method of obtaining solids from liquids or slurries in a fluid bed comprising the steps of producing an ordered, directional motion of hot, dry particles within a zone in the fluid bed, and injecting the liquid or slurry into the zone in a direction which intersects the directional motion of the particles so that liquid droplets can collide with the particles and coat same for efficient evaporation thereby.

By producing an ordered, directional dry-particle motion in the portion of the fluidised bed where the liquid is to be introduced, the droplets are able to be carried away from the spray zone area in an orderly manner; the ordered motion of the dry particles overrides the tendency for bubble-like voids to move through the spray area.

Preferably the liquid is produced initially as a sheet or sheets and each such sheet or sheets is disrupted into droplets at or adjacent the spray zone.

By so directing the droplets that they will intersect the path lines of the solid dry particles, the latter moving in an orderly manner the chances of impact and collision with the resultant carrying away of the combined droplets and dry particles from the spray zone in as quick and orderly a manner as possible are much enhanced.

Further, according to the invention there is provided apparatus for carrying out the method aforesaid comprising a compartment adapted to hold the fluid bed, means for causing said ordered, directional motion and means for injecting the liquid or slurry into said zone.

Figure 2:
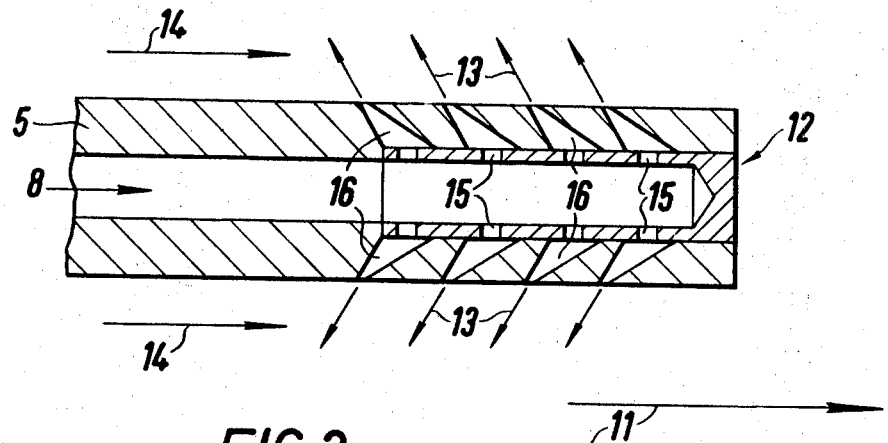

The invention will now be described further, by way of example only, with reference to the accompanying diagrammatic drawings in which:

FIG. 1 is a vertical section taken through part of fluid bed apparatus according to the invention; and FIG. 2 is an enlarged view of a part of the apparatus shown in FIG. 1.

Referring now to the drawings a fluid bed apparatus includes a tube 5 having an inlet 8 to admit a liquid containing solids in solution or in suspension, or a slurry to the nozzle 12.

The liquid or slurry passes through holes or slots 15 (FIG. 2) into narrowing passages which accelerate the liquid and produce liquid sheets 13 outside the nozzle 12.

Air or gas under pressure at inlet 1 is admitted to duct 3 by tube 2. The compressed air or gas passes a metal spider 6 supporting the tube 5 and then through a restriction, in an annular outer nozzle 17 which reduces the area for flow and thus accelerates the air or gas to high velocity. The annular outer nozzle 17 is peripherally located relative to casing 4, to direct high velocity air transversely of the normally fluidised bed 9 in an elongated zone, or stream, 18, of predetermined cross section, designated by the dotted lines. The high velocity air or gas stream passes into the fluid bed 9, the latter consisting of substantially dry, hot solid particles 10 in random disordered motion in a fluidised condition, in container 4. The bed is heated and maintained in a normally fluidised state, with the particles disordered and random, by any suitable means preferably a plurality of gas injection pipes 19 located at a plurality of points in the bottom 20 of casing 4; as set forth in my U.S. patent application Ser. No. 587,026.

A portion of the high velocity air or gas stream produces an ordered directional solid particle motion 11 in zone 18 of the fluid bed which previously was in substantially random disordered motion as shown at 10 (FIG. 1). The high velocity air or gas stream 14 also produces finely atomised droplets from the sheets of liquid 13 issuing from the passages 16. The tapering passages 16 of the inner nozzle 12, discharge the liquid sheets 13 radially, outwardly with inner nozzle 12 extending co-axially within, and along, zone 18, and well in advance of outer nozzle 17, which creates the air blast defining zone 18. The jet-like, radially emitted liquid sheets 13; and the high velocity air stream 14 are so arranged that the liquid droplets are directed and dispersed transversely across the path lines of the dry solid particles which are moving in ordered directional motion 11. Thus the chances of collision of solid particle and liquid droplet are enhanced, and evaporation of the liquid or slurry improved.

In an alternative embodiment, not illustrated, the high velocity air stream is caused to move in a rotational manner, by means of vanes disposed within the duct 3 and/or the constriction 7. Other nozzle structures could be used to produce the desired motion.

As an example of materials which may be used, sodium sulphate particles in the bed may be used to produce solid sodium sulphate from solution.

What I claim is:

1. In fluidised bed apparatus of the normally fluidised type in which hot, dry, solid particles are maintained in disordered random motion along a path by a fluidising gas and in which bubble voids cause disordered random particle motion, the improvement comprising:

outer nozzle means, connected to a source of pressurized air and peripherally mounted relative to the fluidised bed for high velocity flow thereinto to create an elongated zone of predetermined cross section transverse to said path of said fluidised bed in which the particles of said bed all are urged in ordered, unidirectional paths;

and inner nozzle means, connected to a source of pressurized liquid, or slurry and extending co-axially within said zone to well within the periphery of said bed; said inner nozzle means discharging said liquid generally radially outwardly therefrom, and transversely of the path of the ordered particles in said zone, to assure interception of said liquid with said particles.

2. Apparatus as specified in claim 1 wherein: said inner nozzle means is mounted proximate the terminal end of a relatively small diameter, liquid feed pipe, said pipe being encircled by said outer nozzle means to create an annular orifice therein.

References Cited

UNITED STATES PATENTS

| | | | |
|---|---|---|---|
| 2,399,717 | 5/1946 | Arveson | 118—62 X |
| 3,136,705 | 6/1964 | Sommers | 117—100 X |
| 3,152,005 | 10/1964 | Tuttle | 117—100 X |
| 3,218,184 | 11/1965 | Lemelson | 117—100 X |
| 3,385,724 | 5/1968 | Grun | 117—100 |

WILLIAM D. MARTIN, Primary Examiner

M. R. P. PERRONE, Jr., Assistant Examiner

U.S. Cl. X.R.

117—100, 105.3